United States Patent [19]

Shirai et al.

[11] 3,897,407
[45] July 29, 1975

[54] PROCESS FOR PRODUCING CRYSTALLINE PROPYLENE POLYMER

[75] Inventors: Isoo Shirai; Takeshi Suzuki; Koichi Tonooka, all of Ichiharashi, Japan

[73] Assignee: Chisso Corporation, Osaka, Japan

[22] Filed: May 14, 1973

[21] Appl. No.: 359,839

Related U.S. Application Data

[63] Continuation-in-part of Ser. No. 160,281, July 7, 1971, abandoned.

[30] Foreign Application Priority Data

July 14, 1970  Japan.................. 45-61667

[52] U.S. Cl......... 260/88.2 R; 252/429 C; 260/93.7; 260/94.9 E
[51] Int. Cl......... C08f 1/42; C08f 3/10; B01j 11/84
[58] Field of Search.................. 260/93.7, 94.9 E

[56] References Cited
UNITED STATES PATENTS

| | | | |
|---|---|---|---|
| 3,032,510 | 5/1962 | Tornquist et al. | 260/94.9 E |
| 3,451,768 | 6/1969 | Luciani et al. | 260/94.9 E |
| 3,769,373 | 10/1973 | Reed et al. | 260/94.9 E |

FOREIGN PATENTS OR APPLICATIONS 826,908  1/1960  United Kingdom

OTHER PUBLICATIONS

Stauffer, Product Data Sheet, Stauffer Chemical Co., Specialty Chemical Division, Westport Ct. (Jan. 1972).

*Primary Examiner*—Edward J. Smith
*Attorney, Agent, or Firm*—Fred Philpitt

[57] ABSTRACT

Crystalline propylene polymer is produced with a very high efficiency and with few formation of amorphous polymer, from propylene or propylene together with $\alpha$-olefin by contacting propylene or propylene together with $\alpha$-olefin with a catalyst comprising (1) a size-controlled and heat-treated $TiCl_3 \cdot 0.33AlCl_3$ and (2) a dialkylaluminum monohalide or a combination of an alkylaluminum dihalide and $Si(OC_2H_5)_4$, said size-controlled and heat-treated $TiCl_3 \cdot 0.33AlCl_3$ being prepared by reacting $TiCl_4$ with Al powders in a mol ratio of $TiCl_4$ to Al greater than 3:1, removing unreacted $TiCl_4$, size-controlling the resulting powders of $TiCl_3 \cdot 0.33AlCl_3$ by ball-milling in a ball-mill containing the same or substantially the same size of steel or stainless steel balls having a diameter of 25 – 50 mm, at room temperature, to give size-controlled powders consisting of 50 % or more of the particles of 325 meshes on and less than 50 % of the particles of 325 meshes pass, and heat-treating the size-controlled powders at specified conditions of temperature, pressure and time.

5 Claims, 1 Drawing Figure

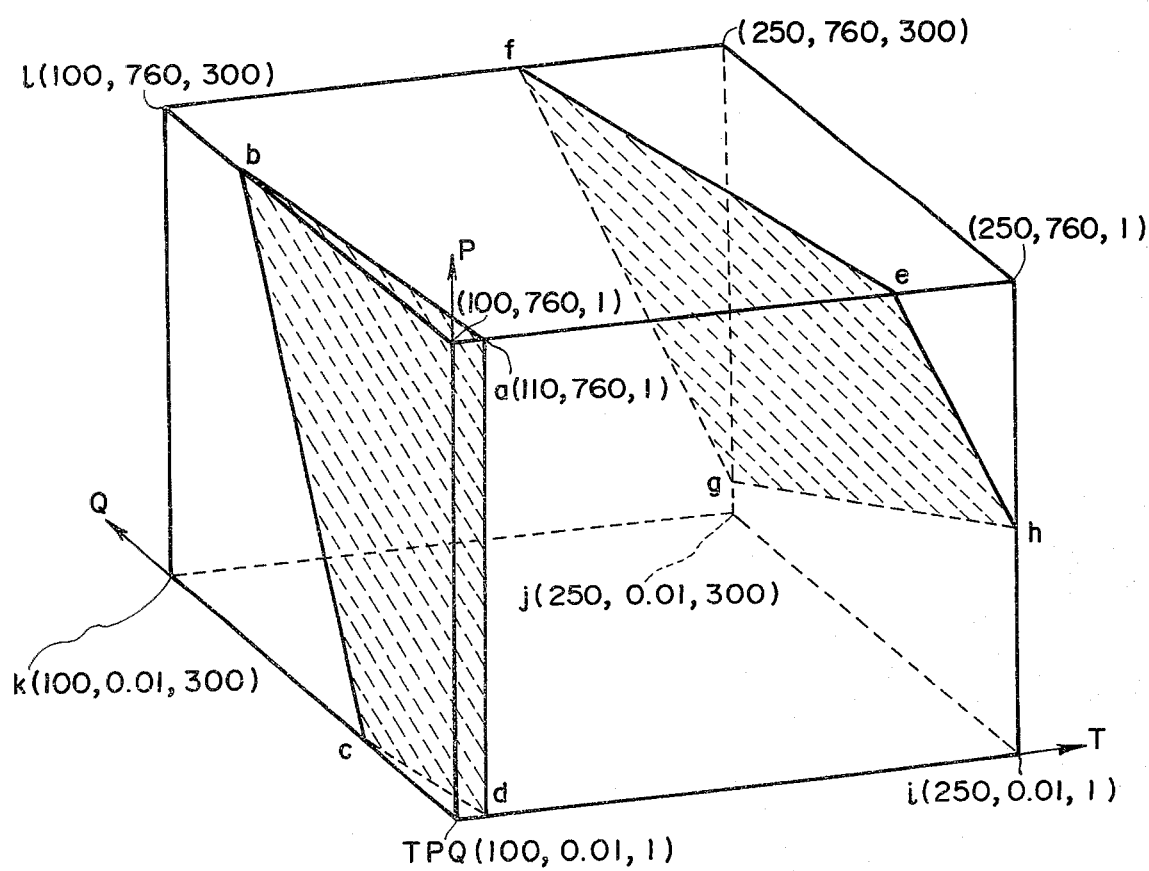

PROCESS FOR PRODUCING CRYSTALLINE PROPYLENE POLYMER

This application is a continuation-in-part of Ser. No. 160,281, filed July 7, 1971 and now abandoned.

DESCRIPTION OF THE INVENTION

This invention relates to a process for producing a crystalline propylene polymer, and more particularly to a process for producing a highly crystalline propylene polymer by a novel catalyst (the term "polymer" referred to herein means both homopolymer and copolymer of propylene).

It is well known to obtain a crystalline polyolefin by contacting olefins with a catalyst system consisting of organometallic compounds of metals of the Groups I to III of the periodic table, and halides of transition metals of the Groups IV to VI of the periodic table in the presence or absence of an inert solvent. It is also well known that an organo-aluminum compound as an organometallic compound and titanium trichloride or titanium tetrachloride as a halide of transition metal can be advantageously used in an industrial scale to obtain crystalline polyolefins.

In that case, a combination of titanium trichloride catalyst and trialkylaluminum, for example, trienthylaluminum, has a very high polymerization activity in the polymerization of α-olefin, particularly propylene, but a ratio of formation of amorphous polymer is also high. On the other hand, it is well known that the catalyst system, wherein dialkylaluminum monohalide, for example, diethylaluminum monochloride, is used in place of trialkylaluminum, is inferior in the polymerization activity to the catalyst system where trialkylaluminum is used, but the ratio of formation of amorphous polymer is considerably lower. Therefore, it can be said that a catalyst system of titanium trichloride catalyst-diethylaluminum monochloride is advantageous in a practical usage.

However, since the increase in the ratio of formation of amorphous polymer increases the production cost, it is very important to lower the ratio of formation of amorphous polymer in commercial operation, and therefore even only 1 % reduction of the amorphous polymer based upon produced total polymer including the amorphous polymer, is regarded as a considerable improvement.

The improvement in the ratio of crystalline polymer to amorphous polymer formed is generally carried out by adding the third component to a combination catalyst of an organo-metallic compound and a transition metal compound (which is usually called "Ziegler-Natta Catalyst"). The catalyst of the present invention is different from the above-mentioned catalyst systems in the use of highly activated titanium trichloride catalyst itself, that is, a highly activated solid solution containing a transition metal compound.

In addition to said method based on the addition of the third catalyst component, the following methods have been proposed to lower the ratio of formation of the amorphous polymer. For example, an increase in the rate of polymerization and decrease in the ratio of formation of amorphous polymer can be effected by heating a catalyst component mixture, which consists of at least one of vanadium trihalide and titanium trihalide, and an organoaluminum sesquihalide at a temperature of 80° – 180°C in the absence of polymerizable olefin prior to the polymerization (Japanese Patent Publication No. 16055/67).

Further, the decrease in the ratio of formation of the amorphous polymer can be carried out by polymerizing propylene or a mixture of propylene and a small amount of ethylene in the presence of as a catalyst system, a combination of an organoaluminum compound and titanium trichloride heat-treated after addition of a halogen compound of groups IV and V of the periodic table (exclusive of titanium trichloride) (Japanese Patent Publication No. 11150/70). However, according to any of these processes, the effectiveness of reducing the formation ratio of amorphous polymer to crystalline polymer is insufficient as compared to the process of the present invention.

An object of the present invention is to produce a crystalline propylene polymer in high yield (the reduction in the proportion of amorphous polymer) without any influence upon the rate of polymerization, molecular weight of polymer and bulk density of solid polymer.

This object can be attained by using a catalyst consisting of a $TiCl_3.0.33AlCl_3$ catalyst prepared from the reduction of $TiCl_4$ with Al powder, subjected to size-controlling specified hereinafter described and heat-treated under the atmospheric or reduced pressure but under the conditions as described below without any addition of a treating agent in advance.

That is to say, said object can be attained by using a catalyst comprising (1) a size-controlled and heat-treated $TiCl_3.0.33AlCl_3$ and (2) a dialkylaluminum monohalide having a general formula of $AlR_2X$ (wherein R is a hydrocarbon radical and X is a halogen atom) or a combination of an alkylaluminum dihalide having a general formula of $AlR'X_2$ (wherein R' is a hydrocarbon radical and X is a halogen atom) and $Si(OC_2H_5)_4$, said size-controlled and heat-treated $TiCl_3.0.33AlCl_3$ being prepared by reacting $TiCl_4$ with Al powders in a mol ratio of $TiCl_4$ to Al greater than 3:1, removing unreacted $TiCl_4$, size-controlling the resulting powders of $TiCl_3.0.33AlCl_3$ by ball-milling in a revolving or vibrating ball-mill containing the same or substantially the same size of steel or stainless steel balls having a diameter of 25 – 50 mm, at room temperature, to give size-controlled powders consisting of 50 % or more of the particles of 325 meshes on and less than 50 % of the particles of 325 meshes pass and heat-treating the size-controlled powders at a temperature of 100° to 250°C under a pressure of 0.01 to 760 mm Hg for 1 to 300 minutes and further under specified relationships (I) between temperature, pressure and time as described below.

Another advantage of the present invention is that a crystalline polymer can be obtained in high yield without using such a complicated method as other well known methods, for example, in which other treating agents are used for titanium trichloride. Further, when the $TiCl_3.0.33AlCl_3$ is used together $AlR_2X$, a combination of these two components with a well known third component may be utilized to make the effectiveness of addition of the third component exhibit.

The above-mentioned preparation of the size-controlled and treated $TiCl_3.0.33AlCl_3$ will be more particularly explained hereunder.

Three mols or more, preferably five mols or more of $TiCl_4$ is reacted with one mol of Al powder in the presence of 0.02 – 0.4 mol of $TiCl_3.0.33AlCl_3$ with stirring under atmospheric pressure at a temperature of 60°C or higher but lower than the boiling point of $TiCl_4$, and after completion of the reaction, an excessive amount of $TiCl_4$ is removed by distillation at a temperature lower than 160°C to give violet powders of $TiCl_3.0.33AlCl_3$ whose sizes are controlled by milling in a ball mill to give a violet product having a composition of $TiCl_3.0.32-0.33AlCl_3$ and a content of 0.01–0.1 % by weight of $TiCl_4$.

As for the above-mentioned ball-mill treatment, an embodiment (A) will be illustrated hereunder.

(A) 800 g of the above-mentioned violet powders of $TiCl_3.0.33AlCl_3$ was milled in a 800 cc air-tight vibrating ball mill with a vibration number of 1,000 v.p.m. and an amplitude of 6 mm, at room temperature for 60 hours to yield size-controlled $TiCl_3.0.33AlCl_3$ having a particle size distribution of 12.4 % of particles of 80 mesh on, 15.8 % of particles of 80 mesh pass and 200 mesh on, 26.9 % of the particles of 200 mesh pass and 325 mesh on and 44.9 % of the particles of 325 mesh pass. Powdery form of $TiCl_3.0.33AlCl_3$ before size-controlling contained a large amount of components of very fine powders and had less than 10 % of those of 325 mesh on and greater than 90 % of those of 325 mesh pass.

Thus sized-controlled titanium trichloride catalyst can be used, as it is, together with an organoaluminum compound, for polymerizing propylene.

As for the effectiveness of the size-control, when the size-controlled catalyst is used for polymerization of e.g. propylene, it gives polypropylene products having a large bulk density. Namely, (1) into a 1.5 l stainless steel autoclave equipped with an electromagnetic stirrer and flushed with nitrogen gas after evacuation of air by connecting to a vacuum pump, there was introduced 1.0 l purified hexane and then 0.3 g of the above-mentioned $TiCl_3.0.33AlCl_3$ which had not been size-controlled and 0.5 g of $AlEt_2Cl$ were added thereto. After addition of 40 ml of hydrogen, temperature was elevated to 70°C and then polymerization of propylene was carried out under a propylene pressure of 10 $Kg/cm^2$ (gauge) for one hour. After polymerization, 100 ml of methanol was added and treated at 70°C for 30 minutes. After the treatment, resultant polymer slurry was filtered off and white polypropylene powder having a bulk density of 0.30 was obtained by vacuum drying of the polymer. (2) Whereas, when polymerization was carried out in the same manner as in the above-mentioned polymerization test (1) except that the size-controlled $TiCl_3.0.33AlCl_3$ obtained in the above-mentioned size-control test (A) was used as catalyst, the bulk density of the resultant polypropylene was 0.44 which was a much higher value compared to the bulk density of the polypropylene of (1). On the other hand, the proportions of atactic polypropylene to total polypropylene were 5.5 % in case of (1) and 5.1 in case of (2), respectively (which shows that there is no much difference).

The titanium component of the catalyst of the present invention has a composition of $TiCl_3.(0.32-0.33)AlCl_3$, as mentioned above, and the content of free $TiCl_4$ in the catalyst is only a slightest amount of 0.01 to 0.1 % by weight. This content of $TiCl_4$ does not vary even by the heat treatment of the catalyst carried out under the atmospheric or reduced pressure.

According to the X ray diffraction method, the violet $TiCl_3.0.33AlCl_3$ has a $\gamma$-type of crystalline structure.

When the above-mentioned size-control is carried out in a ball-mill by using balls having a diameter less than 25 mm, size-controlling effect is not good, and it is difficult to bring the particle size distribution of $TiCl_3.0.33AlCl_3$ to 50 % or more of particles of 325 mesh on. When balls having a diameter greater than 50 mm are used, size-control requires a long period of time e.g. several hundred hours and hence such is not economical.

Important factors for the conditions of treating the size-controlled $TiCl_3 0.033AlCl_3$ are a heating temperature, whether the atmospheric pressure is used or not or how much a degree of pressure reduction is, and a treating time, and a combination of these three factors becomes a further important factor. That is, it is difficult to increase the yield of crystalline polymer when the polymerization of propylene, or propylene and other $\alpha$-olefin is carried out in the presence of the size-controlled $TiCl_3.0.33AlCl_3$ treated under such a condition that these three factors are beyond the suitable ranges.

Among these three factors, particularly the heating temperature has an unsuitable range, irrespective of other two factors. That is to say, no effect can be attained at all or almost at all, if the heating temperature is less than 100°C, almost independently from the degree of pressure reduction and the treating time. Furthermore, no effect or adversely a bad effect is attained likewise when the heating temperature exceeds 250°C. Therefore, the preferable heating temperature is in a range of 120° to 220°C.

As an industrially practicable range for the atmospheric pressure or the degree of pressure reduction, a range of 0.01 to 760 mm Hg can be selected. As a practical range for the treating time, a range of 1 to 300 minutes can be selected.

However, even if these three factors are within the said defined ranges, a good result is not always obtained by any combination of these three factors. That is, a range for a suitable combination of the pressure and the treating time can be determined in correspondence to a specific preferable heating temperature. Further, when a preferable degree of pressure reduction is determined after the preferable heating temperature has been selected, a preferable range of the treating time is determined correspondingly.

These facts are related to a fact that in the heating and atmospheric or reduced pressure treatment, there happens a very small change in the surface structure of the size-controlled $TiCl_3.0.33AlCl_3$ together with a very small reduction in the weight, and a large reduction in the weight or a change in the composition is not preferable. A very small change in crystal surface structure of size-controlled $TiCl_3.0.33AlCl_3$ effective for the polymerization of propylene or propylene and other $\alpha$-olefin is assumed to be its cause. Therefore, a combination of said three factors is a very important factor for controlling a delicate or very small change in the crystal structure. It is necessary and indispensable to exactly determine their ranges and control them to suitable ones.

The slight reduction in the weight of the size-controlled $TiCl_3.0.33AlCl_3$ at the time of heating under the atmospheric or reduced pressure is in the range of 0.1 to 0.01 % by weight of the amount of size-controlled $TiCl_3.0.33AlCl_3$ used i.e. in as small an amount as measurable by a heat balance. The vapor pressures of individual components to be separated by vaporization or sublimation are in the order of $TiCl_4$ (which is a portion of $TiCl_4$ not removed by the above-mentioned distillation and whose content prior to heat treatment is 0.01 – 0.1 %), $AlCl_3$ and $TiCl_3$, but the actual partial pressure of $TiCl_4$ is extremely small.

Also, in the treatment at a temperature of 250°C or lower and for a period of time of 300 minutes or shorter, it does not occur that Al alone is much sublimated.

Thus, the portion lost during the time of heat treatment, also is considered to be $TiCl_3.0.33AlCl_3$. In reality, the size-controlled $TiCl_3.0.33AlCl_3$ after heat treatment, has no change in the composition, within the range of analytical errors. This is the same with the content of $TiCl_4$ as impurity.

As a result of extensive studies, we have succeeded in exactly determining a range of a suitable combination of the above-mentioned three factors. That is, when the heating time is expressed by T (°C), the atmospheric pressure or the degree of pressure reduction by p (mm Hg), and the treating time by Q (minute), a range for T, P and Q, which satisfies the following formulae, is a condition for treating the $TiCl_3.0.33AlCl_3$ to be used in the present invention:

Treating condition (I)

1. $9.52 \times 10^{-3}T - 6.26 \times 10^{-5}P + 3.98 \times 10^{-4}Q \geq 1$
2. $3.53 \times 10^{-3}T + 2.94 \times 10^{-4}P + 3.54 \times 10^{-4}Q \leq 1$
3. $100 \leq T \leq 250$
4. $1 \leq Q \leq 300$
5. $0.01 \leq P \leq 760$ (I)

The treating condition, which satisfies the following conditions, is more preferable.

Treating condition (II)

6. $9.09 \times 10^{-3}T - 2.39 \times 10^{-4}P + 3.80 \times 10^{-4}Q \geq 1$
7. $3.78 \times 10^{-3}T + 2.70 \times 10^{-4}P + 3.79 \times 10^{-4}Q \leq 1$
8. $120 \leq T \leq 220$
9. $5 \leq Q \leq 300$
10. $0.1 \leq P \leq 760$ (II)

The accompanying drawing illustrates a three dimensional scope which satisfies the above-mentioned treating condition I. In this drawing, the co-ordinate axes T, P and Q represent temperature (°C), pressure (mm Hg) and time (min.) in the heat treatment of the catalyst, respectively. A cube is formed based on the equations (3), (4) and (5) whose corner points are $i,j,k,l$, etc.

The plane formed by uniting four points $a$, $b$, $c$ and $d$ is the one given by the formula (1) excluding the case where the sign is inequal, that is, $9.52 \times 10^{-3}T - 6.26 \times 10^{-5}P + 3.98 \times 10^{-4}Q = 1$ ... (1')

Similarly, the plane formed by uniting four points $e$, $f$, $g$ and $h$ is the one given by the formula (2) excluding the case where the sign of the formula is inequal, that is, $3.53 \times 10^{-3}T + 2.94 \times 10^{-4}P + 3.54 \times 10^{-4}Q = 1$ For example, the temperature of the point lying on the first plane also on an edge line $a$, $e$, is sought by following procedures: By inserting into P and Q in the above-mentioned formula (1'), values of 760 and 1, respectively, a value of $T \approx 110$ is obtained.

The scope defined by the treating condition I ((1) – (5)) corresponds to a space enclosed by the above-mentioned two planes $(a,b,c,d)$ and $(e,f,g,h)$ and six planes $(a,d,i,h,e)$, $(a,e,f,l,b)$, $(f,l,k,j,g)$, $(c,d,i,j,k)$, $(b,l,k,c)$ and $(g,j,i,h)$.

The co-ordinate values of the above-mentioned points $a – k$ are shown in the following Table.

Table

| axis point | T | P | Q |
|---|---|---|---|
| a | 110 | 760 | 1 |
| b | 100 | 760 | 240 |
| c | 100 | 0.01 | 120 |
| d | 105 | 0.01 | 1 |
| e | 220 | 760 | 1 |
| f | 190 | 760 | 300 |
| g | 250 | 38 | 300 |
| h | 250 | 398 | 1 |
| i | 250 | 0.01 | 1 |
| j | 250 | 0.01 | 300 |
| k | 100 | 0.01 | 300 |
| l | 100 | 760 | 300 |

As the organoaluminum compound having the general formula, $AlR_2X$ or $AlR'X_2$ (this $AlR'X_2$ is used only in a combination with $Si(OEt)_4$ differently from $AlR_2X$), which is used in a combination with said size-controlled $TiCl_3.0.33AlCl_3$ heat-treated under the atmospheric or reduced pressure, the compounds whose R or R' is such hydrocarbon residue as alkyl, aryl, aralkyl, alkaryl, cycloalkyl, etc., are used, but particularly the compounds whose R or R' is such a lower alkyl group as ethyl, propyl, butyl, etc., are preferable. X represents a halogen atom. Among these compounds, for example, diethylaluminum chloride, ethylaluminum dichloride combined with $Si(OEt)_4$, diisopropylaluminum chloride, diisobutylaluminum chloride, etc. are preferable. It is substantially possible to use them in a mixture with triethylaluminum.

It is also possible in the polymerization of the present invention to carry out a gaseous phase polymerization by contacting propylene or propylene and other $\alpha$-olefin in a gaseous phase with the catalyst without using any solvent. Furthermore, it is possible to carry out polymerization in a liquid olefin without using any solvent, but the polymerization is usually carried out in an inert solvent. As the inert solvent, non-polymerizable hydrocarbons and chlorinated hydrocarbons are particularly preferable. For example, saturated aliphatic hydrocarbons such as pentane, hexane, heptane, octane, decane, etc.; alicyclic hydrocarbons such as cyclopentane, cyclohexane, methylcyclohexane, etc.; aromatic hydrocarbons such as benzene, toluene, xylene, ethylbenzene, etc.; chlorinated aromatic hydrocarbons such as chlorobenzene, dichlorobenzene, $\alpha$-chloronaphthalene, etc.; hydrocarbon mixtures such as kerosene, light oil, etc. are preferable. It is preferable to use every solvent after purification, for example, dehydration, deoxidation, desulfurization, etc.

The polymerization condition is not particularly limited, and the well-known condition is applicable. Preferable polymerization condition is a temperature between room temperature and 160°C and a pressure between atmospheric pressure and 100 kg/cm² G.

To control a molecular weight of a crystalline polymer formed according to the present invention to a proper value, the polymerization can be carried out in the presence of hydrogen. A small amount of hydrogen has an action to increase a rate of polymerization.

Electron donors such as amines, polyethers, organophosphorus compounds, etc., for exmple, triethylamine, pyridine, diethyleneglycol dimethylether, tris-(N,N-dimethyl) phosphoramide, etc. may be added, as the third component, to a combination catalyst of the size-controlled $TiCl_3.0.33AlCl_3$ heat-treated under the atmospheric or a reduced pressure and the organoaluminum compound of the present invention, but there is no need of addition of a third component in case of a combination of $AlR'X_2$ and $Si(OEt)_4$. The polymerization can be carried out in the presence of a catalyst containing the above-mentioned third component.

As the α-olefin used in the combination with propylene, which is applicable to the present invention, for example, ethylene, butene-1, pentene-1, 4-methylpentene-1, etc. can be used alone or in combination.

The present invention will be explained in detail hereunder, referring to preparation of the size-controlled $TiCl_3.0.33AlCl_3$, and reference or comparative examples and examples of the present invention, but the present invention is not limited to the following examples so long as the present invention is not beyond the spirit and scope of the present invention.

Preparation 1 (Size-controlled $TiCl_3.0.33AlCl_3$)

A material consisting of $TiCl_3$ and $AlCl_3$ was prepared by the reaction of $TiCl_4$ and Al powders in a mol ratio of $TiCl_4$ to Al of greater than 3:1, an excessive amount of $TiCl_4$ was separated by distillation and the resulting product was dried to give 6 kg of massive solid product, which was charged in a revolving ball mill consisting of an air tight cylindrical vessel having a diameter of 80 cm and a length of 50 cm and containing steel balls of each 44.5 mm diameter whose volume in bulk is 17 l and treated with 30 R.P.M. for 10 hours to give size-controlled $TiCl_3.0.33AlCl_3$ whose particle size distribution was 45 % particles of 325 mesh pass, 27 % of those in the range of 200 – 300 mesh pass and 28 % of those of 200 mesh on.

Preparation 2 (Size-controlled $TiCl_3.0.33AlCl_3$)

800 g of the same solid product as that of Preparation 1 was charged into a vibrating mill composed of an air-tight, mild steel vessel of a diameter of 16 cm and a length of 16 cm and containing 50 balls of each 36.5 mm diameter and the mill was operated for 20 hours with a circular vibration of 5 mm amplitude and 1000 v.p.m. to give a size-controlled $TiCl_3.0.33AlCl_3$. The size distribution of the product was as follows:

| | |
|---|---|
| 46 %, | 325 mesh pass |
| 25 %, | 200 – 385 mesh |
| 29 %, | 200 mesh on |

REFERENCE EXAMPLE 1

Into a stainless steel, electromagnetic stirring type autoclave having a capacity of 1.5 l flashed with nitrogen gas under vacuum were added 1.0 l of purified hexane, 0.5 g of diethylaluminum chloride, 0.3 g of a size-controlled $TiCl_3.0.33AlCl_3$ catalyst (prepared in Preparation 1) and 40 ml of $H_2$ (in the terms of the normal temperature and the normal pressure) in this order, and then the autoclave was heated with stirring.

After the temperature was elevated to 70°C, polymerization was carried out for one hour while supplying propylene at 10 kg/cm² G so that the pressure might become constant. After completion of the polymerization, 100 ml of methanol was added to the content, and the mixture was treated at 70°C for 30 minutes. After completion of the treatment, the resulting polymer slurry was filtered, and the polymer cake was dried under vacuum, whereby 101 g of white solid polymers were obtained. On the other hand, the filtrate was evaporated to dryness, whereby 5.4 g of amorphous polymers were found to be contained therein. The ratio of hexane-solubles to total polymers produced was $100 \times 5.4/(5.4 + 101) = 5.1$ %. The thus obtained white solid polymer had a melt index of 7.0 according to the ASTM procedure. The melt index will be hereinafter abbreviated to "MI".

REFERENCE EXAMPLE 2

In the same autoclave as in Reference Example 1 were added 1.0 l of purified hexane, 0.5 g o. diethylaluminum chloride, 0.34 g of a size-controlled $TiCl_3.0.33AlCl_3$ (prepared in preparation 1) and 120 ml of $H_2$ (in terms of the normal temperature and the normal pressure), in this order, and then the autoclave was heated with stirring. After the temperature was elevated to 63°C, propylene was fed to the autoclave at 8 kg/cm² G so that the pressure might become constant. After 20 minutes, 1.4 g of ethylene was added thereto over a period of 5 seconds. After 30 minutes from the start of blowing ethylene, 1.4 g of ethylene was again added thereto over a period of 5 seconds. Such operation was repeated total four times (5.6 g of ethylene). During that operation, propylene partial pressure was kept at 8 kg/cm² G by supplying propylene thereto. After completion of the polymerization, 100 ml of methanol was added to the content, and the resultant mixture was treated at 63°C for 30 minutes. After completion of the treatment, the resulting polymer slurry was filtered, and the polymer cake was dried under vacuum, whereby 177 g of white solid polymers were obtained. On the other hand, the filtrate was evaporated to dryness, whereby 27.6 g of amorphous polymers were found to be contained therein. The ratio of the hexane-solubles to the total polymers formed was 13.5 %. The ethylene content of the thus obtained white solid polymers was found 2.60 % by weight by infra-red spectral analysis. MI was 8.0.

REFERENCE EXAMPLE 3

Into the same autoclave as in Reference Example 1 were added 1.0 l of purified hexane, 0.5 g of diethylaluminum chloride, 0.25 g of a size-controlled $TiCl_3.0.33AlCl_3$ (prepared in Preparation 1) and 40 ml of $H_2$ (in terms of the normal temperature and the normal pressure) in this order, and then the autoclave was heated with stirring. After the temperature was elevated to 70°C, polymerization was carried out for 2 hours, while supplying propylene thereto at 10 kg/cm² G so that the pressure might become constant. Then, the autoclave was cooled to 60°C, and unreacted propylene was purged until the pressure was lowered to 2 kg/cm² G. Then, 50 ml of $H_2$ (in terms of the normal temperature and the normal pressure) was added thereto, and a gas mixture of ethylene-propylene was added thereto so that the ethylene concentration of a gas phase of the autoclave might be 20 % by volume and the pressure might be kept at 3 kg/cm² G. The polymerization was carried out for 100 minutes. Then, 100 ml of methanol was added to the content, and the resultant mixture was treated at 60°C for 30 minutes. After completion of the treatment, the resulting polymer slurry was filtered, and the resulting polymer cake was dried under vacuum, whereby 17.5 g of white solid polymers were obtained.

EXAMPLES 1 – 16

Into a flat bottom, glass flask having a capacity of 100 ml flashed with a nitrogen gas under vacuum was filled 30 g of a size-controlled $TiCl_3.0.33AlCl_3$ (prepared in Preparation 1) and heat treatment was carried out at a predetermined temperature and pressure for a predetermined time with stirring under the following conditions. 0.3 g each of the heat-treated $TiCl_3.0.33AlCl_3$ was used and homopolymerization of propylene was carried out in the same procedure as in Reference Example 1. The results are shown in Table 1.

Table 1

| Run No. | Conditions for treating $TiCl_3.0.33AlCl_3$ | | | Condition I | Condition II | Amount of white solid polymer formed | Hexane-solubles | MI | Note | |
|---|---|---|---|---|---|---|---|---|---|---|
| | Temp. | Time | Pressure | | | | | | | |
| | -°C | - min. | -mmHg | — | — | | | | Ref. | |
| 1 | 70 | 30 | 760 | x | x | 101 g | 5.1% | 7.0 | Example | 1 |
| 2 | 110 | 30 | 760 | 0 | x | 105 | 4.8 | 6.5 | Example | 1 |
| 3 | 140 | 15 | 760 | 0 | 0 | 102 | 3.9 | 6.8 | " | 2 |
| 4 | 190 | 30 | 760 | 0 | 0 | 100 | 3.0 | 7.3 | " | 3 |
| 5 | 140 | 30 | 2–3 | 0 | 0 | 105 | 2.3 | 7.2 | " | 4 |
| 6 | 190 | 180 | 2–3 | 0 | 0 | 107 | 2.8 | 6.7 | " | 5 |
| 7 | 300 | 240 | 2–3 | x | x | 105 | 2.1 | 6.9 | " | 6 |
| 8 | 100 | 60 | 760 | x | x | 30.0 | 5.0 | 7.0 | " | 7 |
| 9 | 120 | 120 | 2–3 | 0 | 0 | 98 | 4.7 | 8.0 | " | 8 |
| 10 | 120 | 120 | 760 | 0 | x | 100 | 3.5 | 6.5 | " | 9 |
| 11 | 180 | 30 | 10 | 0 | 0 | 104 | 4.1 | 7.3 | " | 10 |
| 12 | 180 | 240 | 760 | 0 | 0 | 103 | 2.0 | 7.2 | " | 11 |
| 13 | 230 | 30 | 100 | 0 | x | 108 | 2.5 | 8.3 | " | 12 |
| 14 | 230 | 120 | 760 | x | x | 98 | 3.7 | 7.4 | " | 13 |
| 15 | 200 | 120 | 760 | 0 | x | 92 | 4.5 | 6.9 | " | 14 |
| 16 | 200 | 120 | 2–3 | 0 | 0 | 101 | 3.6 | 7.5 | " | 15 |
| 17 | | | | | | 103 | 2.5 | 8.0 | " | 16 |

Note x: The condition does not fall within the scope of the treating conditions.
0: The condition falls within the scope of the treating conditions.
Condition I: The treating conditions (I) ((1) – (5)) as defined before.
Condition II: The treating conditions (II) ((6) – (10)) as defined before.

On the other hand, the filtrate was evaporated to dryness, whereby 44 g of amorphous polymers were found to be contained therein. The ratio of the hexane-solubles to the total polymers formed was 20.0 %. The ethylene content of the thus obtained white polymers was found to be 70 % by weight by infra-red spectral analysis. MI was 3.0.

EXAMPLES 17 – 21

By using the $TiCl_3.0.33AlCl_3$ obtained by heat treatment under the atmospheric or reduced pressure according to the methods of Run Nos. 1 – 17, copolymerization of propylene-ethylene was carried out in the same procedure as in Reference Example 2. The results are shown in Table 2.

Table 2

| Run No. | Conditions for treating $TiCl_3.0.33AlCl_3$ | | | Amount of white solid polymer formed | Hexane-solubles | MI | Ethylene content | Note | |
|---|---|---|---|---|---|---|---|---|---|
| | Temp. | Time | Pressure | | | | | | |
| 18 | — | min. | 09mmHg | 177 g | 13.5% | 8.0 | 2.60% | Ref. Example | 2 |
| 19 | 70°C | 30 | 760 | 179 | 13.0 | 8.3 | 2.65 | Example | 17 |
| 20 | 140 | 30 | 2–3 | 183 | 9.9 | 7.8 | 2.65 | " | 18 |
| 21 | 190 | 15 | 760 | 185 | 8.5 | 7.5 | 2.70 | " | 19 |
| 22 | 190 | 180 | 2–3 | 183 | 8.0 | 7.7 | 2.75 | " | 20 |
| 23 | 180 | 30 | 10 | 189 | 7.4 | 7.6 | 2.60 | " | 21 |

Note  Run No. 19: $TiCl_3.0.33AlCl_3$ treated in the same manner as in No. 2.
Run No. 20: $TiCl_3.0.33AlCl_3$ treated in the same manner as in No. 6.
Run No. 21: Both treating conditions I and II are satisfied.
Run No. 22: $TiCl_3.0.33AlCl_3$ treated in the same manner as in No. 7.
Run No. 23: $TiCl_3.0.33AlCl_3$ treated in the same manner as in No. 12.

EXAMPLES 22 – 24

By using a TiCl$_3$·0.33AlCl$_3$ obtained by heat treatment under a reduced pressure according to the methods of Run Nos. 1 – 17, block copolymerization of propylene-ethylene was carried out in the same manner as in Reference Example 3. The results are shown in Table 3.

completion of the polymerization, unreacted propylene was purged, and 500 ml of methanol was added to the content. The resultant mixture was treated at 80°C for 30 minutes. As a result, 206 g of white solid polymers was obtained. This white solid polymer was extracted by boiling hexane to give a ratio of hexane-solubles to total polymers produced, of 3.2 %. MI was 8.3.

Table 3

| Run No. | Conditions for treating TiCl$_3$·0.33AlCl$_3$ Temp. | Time | Pressure | Amount of white solid polymer formed | Hexane-solubles | MI | Ethylene content | Note |
|---|---|---|---|---|---|---|---|---|
| | | min. | mmHg | | | | | |
| 24 | — | | | 175 g | 20% | 3.0 | 7.0% | Ref. Example 3 |
| 25 | 140°C | 30 | 2–3 | 180 | 13 | 2.5 | 7.5 | Example 22 |
| 26 | 190 | 120 | 2–3 | 177 | 11 | 2.3 | 7.6 | " 23 |
| 27 | 180 | 30 | 10 | 185 | 10.5 | 2.2 | 7.5 | " 24 |

Note  Run No. 25:  TiCl$_3$·0.33AlCl$_3$ treated in the same manner as in No. 6.
      Run No. 26:  Both treating conditions I and II are satisfied.
      Run No. 27:  TiCl$_3$·0.33AlCl$_3$ treated in the same manner as in No. 12.

REFERENCE EXAMPLE 4

Reference Example 1 was followed except that purified monochlorobenzene was used in place of purified hexane, and 105 g of white solid polymers was obtained. The ratio of monochlorobenzene-solubles to total polymers produced was 5.5 %. MI was 5.4.

EXAMPLE 25

Reference Example 4 was followed except that the TiCl$_3$·0.33AlCl$_3$ treated in the same manner as in Example 7 was used, and 108 g of white solid polymers was obtained. The ratio of monochlorobenzene-solubles to total polymers produced was 3.9 %. MI was 5.9.

REFERENCE EXAMPLE 5

Into the same autoclave as in Reference Example 1, were added 600 g of liquefied propylene, 0.5 g of diethylaluminum chloride, 0.2 g of size-controlled TiCl$_3$·0.33AlCl$_3$ (prepared in Preparation 1) and 1.5 l of H$_2$ (in terms of the normal temperature and the normal pressure), in this order. Temperature was elevated to 70°C, and polymerization was carried out for one hour. After

EXAMPLE 26

Reference Example 5 was followed except that TiCl$_3$·0.33AlCl$_3$ treated in the same manner as in Example 7 was used, and 211 g of white solid polymers was obtained. The ratio of hexane-solubles to total polymers produced was 1.1 %. MI was 8.4.

REFERENCE EXAMPLE 6

Reference Example 1 was followed except that 0.55 g of EADC (ethylaluminum dichloride) and 0.2 g of Si(OEt)$_4$ (tetraethoxysilane) were used in place of 0.5 g of diethylaluminum chloride of Reference Example 1. 84 g of white solid polymers was obtained. The ratio of hexane-solubles to total polymers produced was 5.5 %. MI was 7.4.

EXAMPLE 27

Reference Example 6 was followed except that TiCl$_3$·0.33AlCl$_3$ treated in the same manner as in Example 7 was used, and 83 g of white solid polymers was obtained. The ratio of hexane-solubles to total polymers produced was 3.5 %. MI was 7.0.

The results of Reference Examples 4 to 6 and Examples 25 to 27 are shown in Table 4.

Table 4

| Run No. | Treating Conditions of TiCl$_3$·0.33AlCl$_3$ Temp. | Time | Pressure | Treating Condition Condition I | Condition II | Amount of Production of White Solid Polymer | Hexane soluble | MI | Note |
|---|---|---|---|---|---|---|---|---|---|
| | °C | min. | mmHg | | | g | % | | |
| 28 | — | — | — | — | — | 105 | 5.5 | 5.4 | Ref. Ex. 4 |
| 29 | 190 | 180 | 2–3 | 0 | 0 | 108 | 3.0 | 5.9 | Ex. 25 |
| 30 | — | — | — | — | — | 206 | 3.2 | 8.3 | Ref. Ex. 5 |
| 31 | 190 | 180 | 2–3 | 0 | 0 | 211 | 1.1 | 7.4 | Ex. 26 |
| 32 | — | — | — | — | — | 84 | 5.5 | 7.5 | Ref. Ex. 6 |
| 33 | 190 | 180 | 2–3 | 0 | 0 | 83 | 3.5 | 7.0 | Ex. 27 |

Note
Run Nos. 29, 31, 33:
Catalyst treatment was same with that of Example 6.

What is claimed is:

1. A process for producing crystalline propylene polymers which comprises contacting propylene or a mixture of propylene and another α-olefin, with a catalyst comprising
   1. a size-controlled and heat-treated $TiCl_3.0.33AlCl_3$ and
   2. a dialkylaluminum monohalide having the general formula of $AlR_2X$ (wherein R is a hydrocarbon radical and X is a halogen atom) or a combination of an alkylaluminum dihalide having a general formula of $AlR'X_2$ (wherein R' is a hydrocarbon radical and X is a halogen atom) and $Si(OC_2H_5)_4$,
   3. said size-controlled and heat-treated $TiCl_3.0.33AlCl_3$ being prepared by reacting $TiCl_4$ with Al powders in a mol ratio of $TiCl_4$ to Al greater than 3:1, removing unreacted $TiCl_4$, size-controlling the resulting powders of $TiCl_3.0.33AlCl_3$ by ball-milling in a revolving or vibrating ball-mill containing the same or substantially the same size of steel or stainless steel balls having a diameter of 25 – 50 mm, at room temperature, to give size-controlled powders consisting of 50% or more of the particles of 325 meshes on and less than 50% of the particles of 325 meshes pass, and heat-treating the size-controlled powders:
   a. at a temperature (T) which satisfies the conditions $100°C \leq T \leq 250°C$.,
   b. at a pressure (P) which satisfies the conditions $0.01 \text{ mmHg} \leq P \leq 760 \text{ mmHg}$,
   c. for a time (Q) which satisfies the condition 1 minute $\leq Q \leq 300$ minutes,
   and wherein the following relationship between T, P and Q is maintained:
   d. $9.52 \times 10^{-3}T - 6.26 \times 10^{-5}P + 3.98 \times 10^{-4}Q \geq 1$
   e. $3.53 \times 10^{-3}T + 2.94 \times 10^{-4}P + 3.54 \times 10^{-4}Q \leq 1$.

2. The method according to claim 1 wherein the titanium component is subjected to a heat treatment:
   a. at a temperature (T) which satisfies the conditions $120°C \leq T \leq 220°C$.,
   b. at a pressure (P) which satisfies the conditions $0.1 \leq P \leq 760 \text{ mmHg}$,
   c. for a time (Q) which satisfies the condition 3 minutes $\leq Q \leq 300$ minutes,
   and wherein the following relationship between T, P and Q is maintained
   d. $9.09 \times 10^{-3}T - 2.39 \times 10^{-4}P + 3.80 \times 10^{-4}Q \geq 1$
   e. $3.78 \times 10^{-3}T + 2.70 \times 10^{-4}P + 3.79 \times 10^{-4}Q \leq 1$.

3. A process according to claim 1, wherein the organo-aluminum compund is diethylaluminum chloride, ethylaluminum dichloride plus $Si(OC_2H_5)_4$, ethylaluminum sesquichloride, diisopropylaluminum chloride or diisobutylaluminum chloride.

4. A process according to claim 1 wherein the contacting is carried out at room temperature to 160°C under atmospheric pressure to 100 $kg/cm^2G$.

5. A process according to claim 1 wherein said another α-olefin is ethylene, butene-1, pentene-1, or 4-methylpentene-1 alone or in combination.

* * * * *